United States Patent Office 3,234,600
Patented Feb. 15, 1966

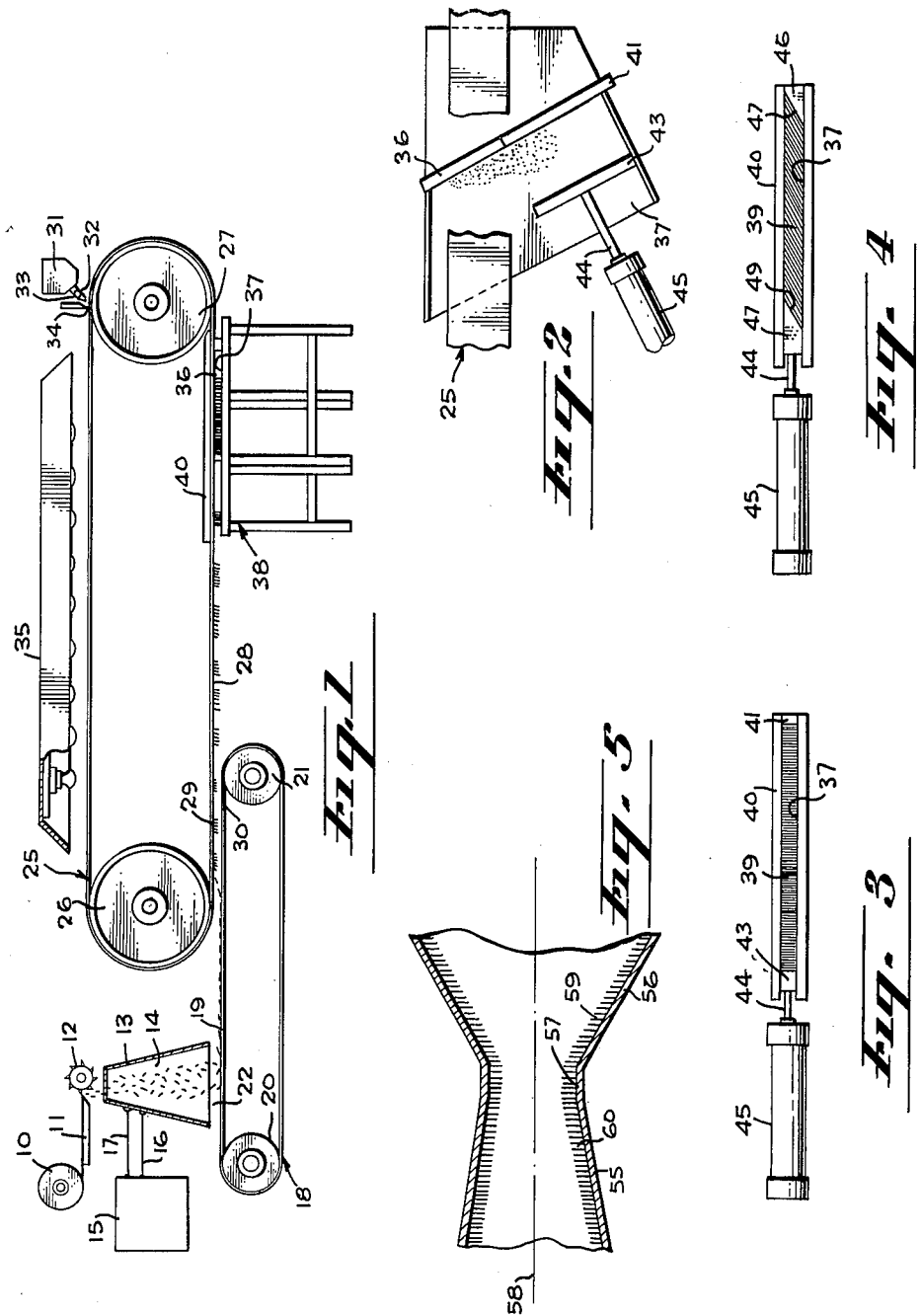
INVENTOR.
WILLIAM B. GOLDSWORTHY
BY
Beehler & Shanahan
ATTORNEYS

3,234,600
PREPARING A LINER MATERIAL OF
ABLATION RESISTANCE
William Brandt Goldsworthy, 2504 Novato Place,
Palos Verdes Estates, Calif.
Filed Nov. 10, 1961, Ser. No. 151,554
5 Claims. (Cl. 19—144)

The invention relates to the preparation of ablation resistant sheets of such character that they may also serve as thermal insulation to protect metal housings which are used to contain streams of burning gas at very high temperatures.

Conditions of the type herein made reference to exist at the nozzle exit cone of a rocket. They also exist in various types of jet propelled vehicles and by way of example exist on the exterior surface of a re-entry cone of a space vehicle, missile, or satellite. The method, however, is not confined to the uses mentioned inasmuch as it is usable generally for many commercial uses in the foundry art and metallurgical industry where ultra-high temperatures may be encountered from time to time. The rocket and missile uses, however, are the simplest and perhaps most spectacular. To simplify the disclosure, reference will be made predominantly to these particular uses.

Today's rocket and missile industry have imposed a temperature problem upon structural materials far more demanding than anything that was ever previously anticipated. Burning gases in a liquid or solid propellant rocket motor range in temperature from 4,000 to 7,000 degrees F. for periods varying from a few seconds to several minutes, while the re-entry of a space vehicle into the earth's atmosphere may produce temperatures of as high as 12,000 degrees F. for a similar period of time. All of these temperatures are well beyond the melting points of any of the known structural metals. Therefore, if structural integrity is to be maintained, the metal structures must be insulated against these terrific heats.

For many years the only materials which have performed satisfactorily in these critical temperature areas have been solid units of carbonaceous materials such as graphite. These materials have performed quite satisfactorily with respect to their ability to resist extreme high temperatures for very short periods of time. They have had, however, two very important drawbacks. One is the very fragile nature of the material which makes it subject to cracking and chipping during assembly handling and in service. The other, and perhaps most important, is the relatively high thermal conductivity of these materials which means that the backup structure on which the material is placed reaches breakdown temperature in a very short period of time. This circumstance limits the firing time of the rocket, for example, when the material is used in the exit cone of such a vehicle.

It has been found in recent years that the use of high temperature organic resins such as modified phenolics and phenolsilanes as a binder for inorganic fibers such as leached fiberglass (silica), quartz, zirconium oxide, zirconium carbide, alumina, graphite, and other high refractory materials provides a much more satisfactory protective coating due to the much lower thermal conductivity of material of this nature and therefore the ability to protect the metal backup structure or substructure for greater periods of time.

Because both the resin binder and the inorganic fiber used as a filler material have melting points considerably below the maximum temperatures encountered, these materials actually spall off or ablate at the temperatures and gas velocities encountered in the nozzle or blast tube area. Obviously, the less spalling off or ablation exhibited by the liner material, the better the material. If there is to be an ablation rate, however, this rate should not only be as low as possible, but should also be exactly predictable. Otherwise it would be impossible to forecast the performance of the particular missile under design. In attempting to slow and control this ablation rate, research has disclosed that orienting all of the fiber filler in a direction normal to the flow of the hot gas produces the optimum results from an ablation standpoint. However, compromise between ablation rate and thermal conductivity is often achieved by orienting the fiber at some angle other than 90 degrees to the line of flow. It is readily apparent that orienting the fibers in this end grain configuration in a cone, double cone, cylinder, or external convex surface is a most difficult procedure.

The method most commonly used currently is a procedure known as the layup of a liner by a device known as a tape winding machine. In this method, the particular type of fiber to be used, whether it is silica, quartz, graphite, or other fiber, is woven into a fabric; the fabric is then preimpregnated with a binder resin and slit into tape of the width desired to give the ablation coating thickness needed. A tape winding machine then feeds this tape onto a mandrel in such fashion that the tape is wound with its width axis at 90 degrees to the centerline of the mandrel. It becomes apparent that winding tape around a diameter on edge in this fashion requires that the outer edge of the tape travel a much greater distance than the inner edge. Consequently, a great number of systems have been devised and used to compensate for this condition. In some instances the tape is notched, slit, and made up of loosely held unidirectional fiber in order to try to accomplish the objective sought. None of these methods and machines have proven sufficiently satisfactory to date, although many millions of dollars have been spent in their development. Some idea of the enormity of this task may be had by reference to the average thickness of these tapes which is about .010 of an inch. In instances where the method is used for some of the larger rocket nozzles the material must be wound on edge in this fashion to a height of approximately eight feet.

After the material has been wound on the mandrel in the fashion described, it then must be molded under pressure by one of two methods, namely, either by autoclave or by matched metal die molds. Pressures applied must be of a magnitude of an absolute minimum of 150 p.s.i. The density of the finished laminate established by pressurizing as described is of paramount importance if ablation rate is to be low and predictable. After molding under pressure, in most cases both the inside diameter and the outside diameter of the molded part must be finished machined to the dimensions required for the specific part. This is partially due to inability to hold required tolerances when molding, and the fact that the lapping plies of each layer form resin rich pockets on the surface of the inside diameter against the mandrel which is highly unsatisfactory from an ablation standpoint.

It can be seen that the costs of bringing this liner from raw material to finished product are extremely high. In addition to the cost of the method above described, the cost of the raw material, in the form used, is also extremely high. The particular fiber used, for example, must be twisted, plied into yarn, and woven into fabric before it is suitable for use with these processes.

Current progress in the rocketry and missile industries imposes higher and higher demands on length of burning time and burning temperatures. Consequently, a great deal of research is going into the development of higher and higher melting point fibers. This research points up the fact that although many of these fibers may be produced in short lengths, their production in continuous lengths or fibers of sufficient length to allow plying into yarn is extremely difficult and costly, if not in fact impossible. The invention here disclosed comprehends a method of orienting any of these fibers in an endwise position at any desired angle and by this technique produce a mat or sheet of required thickness, the fibers of which have been preimpregnated with the specific binder resin best suited for the particular end use. This mat material is then patterned and molded to final finished form by either of the two molding processes described above. It may be readily seen that an article molded from the mat material proposed is of higher density than that molded from a woven fabric, due to the absence of any cross filaments of fiber. Consequently, the molded liner has higher ablation characteristics than a tape wound liner.

The economics of this approach are also apparent when it is considered that the mat or sheet is formed from the base fiber with no intermediate plying, twisting, or weaving steps. Also, it can be seen that the amount of labor required to produce an end product by this technique requires only a fraction of that required by other current methods.

Among the objects of the invention is to provide a new and improved process and method for producing an ablation resistant and at the same time thermally insulating sheet material which can be applied to a metal backing and which will be capable of withstanding extremely high temperatures far in excess of those which the metal backing alone might be capable of supporting.

Another object of the invention is to provide a new and improved method and process of sizing individual fiber strands either singly or in groups and depositing the fibers in endwise position upon some collecting surface so that virtually all of the fibers are initially arranged in parallel relationship with respect to each other, thereby making it possible to densify the fibers to virtually any degree desired and to fasten them in a sheet form in densified condition subject to and ready for whatever molding step might be desirable to place the sheet thus formed in condition for use.

Still another object of the invention to to provide a new and improved process and method for depositing fibers by electrostatic means upon a supporting surface and fastening the fibers to that surface by a suitable adhesive for a period long enough to collect them, densify them and pass them to an appropriate collecting area where they can be made into a mat or sheet for subsequent processing.

Still another object of the invention is to provide a new and improved process and product for the orientation of inorganic fibers, either singly or in groups and of relatively short lengths in a manner such that the fibers after orientation and deposition upon a makeup surface can be compacted at will to virtually any reasonable degree of density and which either simultaneously or on some other occasion can be given a selected degree of tilt or angularity with respect to the surface and held in such a position of angularity until they have been effectively molded to fixed and permanent position.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a schematic view of various mechanical elements which may be made use of in performing the method and process herein disclosed.

FIGURE 2 is a fragmentary plan view showing the manner in which fibers are removed and stacked prior to being made up into sheets.

FIGURE 3 is a fragmentary view of an apparatus by means of which fibers may be stacked and compacted in normal orientation.

FIGURE 4 is a view similar to FIGURE 3 showing apparatus wherein fibers may be stacked and compacted in an obliquely arranged orientation.

FIGURE 5 is a schematic representation in longitudinal section of the exit cone of a rocket showing the orientation of fibers which have been obliquely disposed in order to minimize the effect of ablation when in use.

The process or method may be described broadly as consisting of a series of operations, the first step being impregnating the fiber with the resin system specified. Inorganic fibers already referred to are employed and include but are not limited to leached glass, quartz, zirconium oxide, zirconium carbide and alumina. Graphite may also be used. Fibers known to the trade as "Refrasil" by H. I. Thompson Fiberglass Co. and "Siltemp" by Haveg Industries are particularly satisfactory. If the fibers are of a continuous nature, this, namely, coating the exterior may be accomplished by drawing the fiber through a resin bath and then through a drying tunnel to dry or prepolymerize the resin system. If the fibers are not of a continuous nature, the resin may be applied from an emulsion or solvent slurry and subsequently dried; or it may be applied by dropping the fibers through a resin impregnated atmosphere or by any other suitable technique. In this way also the exteriors of the fibers may become coated with adhesive. If the particular fiber or resin system should be of a nature that does not allow preimpregnation, the resin can be applied to the finished mat by immersion, or by drawing the resin through the mat with either pressure or a vacuum, thereby retaining only the amount of resin in the mat that is desired. Typical resins include but are not limited to various phenolics. Incompatible adhesives, namely, adhesives which are such that they may impair the action of the adhesive which will ultimately be used to secure the fibers together and must therefore be removed before the final adhesive step is undertaken, acceptable to the process include pressure sensitive adhesives, natural and vinyl latex and even gelatin. The latter is particularly easy to remove after the mat is formed. Specific resins useful in the process include "91LD" by Cincinnati Testing Laboratory, "RS2800" by Monsanto Chemical Co., and "801" by Ironsides Chemical Co.

If the preimpregnated fibers are of a continuous nature, the strands of fiber are then cut to the desired length to give the required mat thickness, passed through an ionizing chamber to give them a polar charge, and carried to a location adjacent a continuous stainless steel moving belt that has an electrostatic charge of opposite polarity and allowed to impinge thereon. If the fibers are not of a continuous nature, they would be presized and fed through this same system from a suitable feed hopper. The attraction of opposite electrical charges causes the fiber to impinge upon the belt in a vertical position normal to the face of the belt. However, when the fiber strikes the belt, the electrical charges reverse causing the fiber to want to fall away, thereby necessitating a means of retaining the fiber on the belt in its upright position. The preferable retention method is to continuously apply an adhesive to the moving belt so that the tack of the adhesive will retain the fiber upon impingement and hold it in its upright position. There are many adhesive systems that can be used and one would be chosen in each case which is compatible with the impregnating resin used on the fiber. For example, if the fiber is impregnated with a phenolic resin, the adhesive should be the same or a similar phenolic applied from a solvent system to the belt and dried to sufficient tack to be retained on the fiber. If the peculiarities of the resin system or the fiber are such that a compatible adhesive is not feasible, then an adhesive is applied to the fibers which is capable of being removed therefrom either chemically or mechanically in a secondary operation. Since as described the belt is employed as a collector and carrier of the fibers and never as part of the finished product the adhesive needs to be one of light holding power which remains tacky and does not harden on the belt.

The nature of electrodeposition is such that long fibers do not deposit densely on the belt but deposit rather sparsely. After deposition they travel along the continuously moving belt to a take-off or scrape-off bar which causes them to flow from the belt onto a receiving table or conveyor. Fibers stacking against this take-off bar become considerably densified, and it can be seen that the angle of the fiber in the mat can be altered by the angle on the face of the take-off bar. If further densification is desired, sheets of the material may be taken from the take-off table and further densified by being compressed in a suitable slab die by means of a hydraulic ram. If desired, the orientation angle of the fiber in the mat can again be adjusted at this point by adjusting the angle of the backup bar and the hydraulic ram bar.

It can be seen that the width of the finished sheet is dictated by the width of the stainless steel belt, the length by any length cut at the take-off table, and the thickness by the length and angle of the fiber in the mat. These dimensions of end product will vary according to customer requirements. The mat produced by the foregoing process will then be shipped to the customer for his final processing.

Although emphasis has been placed essentially upon the employment of electrostatic means for the orientation and deposition of relatively short fibers upon a collecting and supporting surface, other expedients may be employed for the orientation of fibers, as desired, such for example as a flotation of the fibers, or by agitating and orienting in a stream of air or gas or other expedient usable particularly with fibers of inorganic material other than metallic which for the most part are non-conductors.

Although the method has been described in general in the foregoing disclosure, reference to the apparatus disclosed by way of example is made in order to more particularly point out the transition from fibers in an endless strand to fibers in the form of a mat or sheet ready for ultimate forming.

In the diagrammatic representation of the apparatus suitable for the practice of the method there is shown a spool 10 upon which a strand of fiber may be wound and which is used as a feed spool. Strands of fiber on the spool may consist of extremely fine filaments of individual fibers as small as .000032 inch in diameter, these individual filaments being customarily roved to ends comprising groups of filaments and having a diameter somewhere in the neighborhood of .008672 inch. In common practice and for ease in handling, ends may be arranged in groups varying considerably but frequently in groups of sixty wherein the group will often have a diameter of more or less .052 inch. The handling of fiber in this fashion, however, is primarily a matter of convenience where the fiber is such that it can be made in a continuous strand. It is appreciated that some of the fibers cannot be handled in this fashion and must be collected initially in short lengths.

Under circumstances, however, where an endless fiber strand is available, it is fed from the spool 10 along a feed table 11 to a chopper blade 12 which can be adjusted to cut the fibers to any desired length. In practice, lengths frequently usable vary from ⅜ inch to 1½ inches depending upon the end result desired.

Because of their extremely fine character, fibers, which after chopping may separate to individual filaments, are preferably confined within a hood 13 forming an ionizing chamber 14. Within this chamber, the individual fibers are given an electrostatic charge from an electrostatic generator 15 from which leads 16 and 17 are carried to the electrostatic chamber.

An endless belt 18 having a material carrying reach 19 is mounted upon supporting pulleys 20 and 21 so that the belt lies between a delivery area 22 where the belt receives the electrostatically charged pieces of fiber as they fall from the electrostatic chamber and discharge end 30. As has been previously noted, the fibers may be initially impregnated on their surface, although this condition is not necessarily prevalent. It will also be advisable to have the belt 18, which may be of stainless steel, possessed of an electrostatic charge of the same electrical characteristics as the electrostatic charge given to the individual fibers. If desired, some means may be provided for effectively spreading the charged fibers evenly over the belt. Also the speed of movement of the belt may be adjusted such that fibers lying on it will have a desired degree of density.

A second endless belt 25 also preferably of stainless steel is supported on pulleys 26 and 27 arranged in such a fashion that a material carrying reach 28 of the belt 25, namely the length of belt on the lower side between the pulleys 26 and 27, has its loading end 29 adjacent the discharge end 30 of the belt 18. The belt 25 is provided with an electrostatic charge having an opposite electrical characteristic from the electrostatic charge given to the fibers. As, for example, the fibers may have a positive charge and the belt 25 may have a negative charge. Under these circumstances, the fibers will be drawn upwardly from the discharge end 30 of the belt 18 to the loading end 29 of the belt 25.

In order that the fibers may remain temporarily attached to the material carrying reach 28 of the belt 25 after deposition and after losing their electrostatic charge, a resin of some description is applied to the belt 25. Resin of an appropriate kind is contained within a reservoir or tank 31 from which it passes through a discharge spout 32 controlled by the setting of a valve 33. The resin is spread evenly and to a desired thickness upon the exposed surface of the belt by employment of a substantially conventional doctor blade 34. Thereafter, the belt coated as described with the resin travels beneath a set of cure stage lamps 35, the heat from which is employed to partially set the condition of the film of resin to a proper degree of tack. This, of course, is customarily determined by the particular resin employed, the thickness of film desired, the length of travel from the point of application of the resin to the loading end 29 as well as by the temperature or degree of heat employed. Suitable adjustments can be made not only initially but also during progress of the process, in order to secure exactly the right degree of tack desired.

By use of the apparatus just described, the fibers will attach themselves perpendicularly with respect to the plane surface of the material carrying reach 28 of the belt and the ends of the fibers will adhere to the tacky adhesive film which has been established as just described. The fibers will then travel along the reach 28 until they strike against a scraper and stacking bar 36 which is mounted upon a suitable table 37 in an oblique direction across the path of travel of the reach 28 as clearly shown in FIGURE 2. The scraper and stacking bar is fitted closely enough to the surface of the reach 28 of the belt 25 to effectively scrape off all of the fibers which have been deposited and which adhere to the belt and which, as shown, directs the fibers obliquely transversely to the upper surface 37 of a stacking table 38. Fibers 39 thereby accumulate in stacked condition upon the surface 37 and become compacted to a material degree before they pass from the stacking table. By stacking it is meant the fibers in parallel alignment are scraped from the belt and passed to positions against fibers which have previously been removed from the belt. In order to properly confine the oriented and accumulated pieces of fiber 39, there is provided a plate 40 which is parallel to and which is in a position spaced from the surface 37. The spacing, is of course, approximately the same as the length of the particular fibers being handled by the process when normal fiber orientation is to be preserved as indicated in FIGURE 3. A block or stop 41 is positioned at one side with a space formed between the plate and the surface. At the other side there is provided a plunger 43 or a pressure bar which has attached thereto a piston rod 44 driven by a suitable pressure cylinder 45. By operation of the pressure cylinder and the plunger 43, fibers 39 are pressed to a desired degree of density within the space provided. To accomplish this in the perpendicular orientation shown, the face of the block 41 is perpendicular to the surface 37 as is also the face of the plunger 43.

On those occasions where an angular orientation is to be achieved, the apparatus is set up as illustrated in FIGURE 4. In this arrangement the plate 40 is placed more closely to the surface 37 than the length of the fibers 39 by an amount determined by the pitch or oblique relationship desired of the fibers. In this instance a block or stop 46 is employed provided with an oblique face 47. The angularity of the oblique face 47 will be the same angularity ultimately desired of the fibers when stacked in oblique position as shown in FIGURE 4. In a similar fashion, a plunger or bar 48 is provided with a similarly disposed oblique face 49. When the plunger is driven by operation of the cylinder 45 and piston 44, the fibers will be forced into the tilted relationship shown by being compressed or densified between the oblique faces 47 and 49.

By way of example only, there is shown in FIGURE 5 an exit nozzle of a rocket which consists of an inflow cone 55 and an outflow cone 56 connected together at a throat 57. Customarily, the inflow cone has a relatively gentle slope and the outflow cone has a relatively wide angle slope. Preferably, the long axes of fibers used for the lining should be more or less perpendicular to the longitudinal axis 58 of the cones as shown in FIGURE 5. Since it is preferable to have the fibers with their axes perpendicular to the longitudinal axis 58, the angularity of fibers of a sheet or mat 59 in the outflow cone will be such that when finally applied and installed, they will, in fact, be about perpendicular to the longitudinal axis 58. The degree of angularity will vary considerably with circumstances and may be as much as from 20 degrees to 40 degrees from vertical. Perpendicular orientation, however, in the inflow cone 55 will be somewhat more difficult to achieve.

From the foregoing description of both the process and method generally and a typical apparatus, it will be appreciated that individual fibers of virtually any type or description can be chopped or cut to a length desired and then deposited in parallel relationship in a manner adapted to retain them until they can be subsequently handled. The densification as described can be made to virtually any degree desired at an angularity also as desired. Moreover the process can be continuous and under careful control at all times. As such, a mat or sheet can be produced which is well adapted to any one of the several uses heretofore indicated.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A method of assembling relatively short filaments of generally uniform length preparatory to bonding of said filaments to one another to form a mat, comprising the steps of: supporting said filaments at one end on a carrier surface in such manner that said filaments extend generally parallel to one another and transverse to said carrier surface, and effecting relative lateral movement of said filaments along said surface toward one another, thereby to compact said filaments into a relatively dense mass of parallel filaments.

2. A method of assembling relatively short filaments of generally uniform length preparatory to bonding of said filaments to one another to form a mat, comprising the steps of: supporting said filaments at one end on a carrier surface in such manner that said filaments extend generally parallel to one another and transverse to said surface, and effecting relative movement between said carrier surface and a second surface disposed in a plane transverse to said carrier surface and having a boundary edge located in close proximity to said carrier surface, in such manner that the relative movement of said carrier surface with respect to said second surface occurs along a direction line generally parallel to said carrier surface and transverse to said second surface, thereby to cause relative lateral movement of said filaments against said second surface to orient said filaments at a predetermined angle relative to said carrier surface and compact said filaments into a relatively dense mass of parallel filaments.

3. A method of assembling relatively short filaments of generally uniform length preparatory to bonding of said filaments to one another to form a mat, comprising the steps of: supporting said filaments at one end on a carrier surface in such manner that said filaments extend generally parallel to one another and transverse to said carrier surface, and effecting relative movement between said carrier surface and a second surface disposed in a plane transverse to said carrier surface and having a boundary edge located in close proximity to said carrier surface, in such manner that the relative movement of said carrier surface with respect to said second surface occurs along a direction generally parallel to said carrier surface and inclined at an acute angle relative to said second surface, thereby to cause relative lateral movement of said filaments against said second surface, to orient said filaments at a predetermined angle relative to said carrier surface, compact said filaments into a relatively dense mass of parallel filaments, and to effect movement of the compacted filaments laterally from said carrier surface.

4. A method of assembling relatively short filaments of generally uniform length preparatory to bonding of said filaments to one another to form a mat, comprising the steps of: electrostatically charging said filaments to one polarity, conveying said charged filaments into close proximity to an adhesively coated carrier surface which is electrostatically charged to the opposite polarity, thereby to effect endwise depositing of said filaments onto said adhesively coated carrier surface and supporting of said filaments on said carrier surface in such manner that said filaments extend generally parallel to one another and transverse to said carrier surface, and moving said carrier surface relative to a second surface disposed in a plane transverse to said carrier surface and having a boundary edge located in close proximity to said carrier surface, in such manner that the relative movement of said carrier surface with respect to said second surface occurs along a direction generally parallel to said carrier surface and inclined at an acute angle relative to said second surface, thereby to cause lateral movement of said filaments against said second surface to orient said filaments at a predetermined angle relative to said carrier surface, compact said filaments into a relatively dense mass of parallel filaments, and effect movement of the compacted filaments laterally from said carrier surface.

5. The method according to claim 4 including the further step of: laterally compressing said filaments subsequent to movement of said filaments from said carrier surface.

References Cited by the Examiner

UNITED STATES PATENTS

| | | | |
|---|---|---|---|
| 3,034,566 | 5/1962 | McKay | 156—296 |
| 3,082,138 | 3/1963 | Hjelt | 156—380 XR |

FOREIGN PATENTS

| | | |
|---|---|---|
| 521,256 | 1/1956 | Canada. |

EARL M. BERGERT, *Primary Examiner.*